US008886943B2

United States Patent
Kiessling et al.

(10) Patent No.: US 8,886,943 B2
(45) Date of Patent: Nov. 11, 2014

(54) AUTHENTICATION OF A VEHICLE-EXTERNAL DEVICE

(75) Inventors: Horst Kiessling, Freising (DE); Burkhard Kuhls, Stadtbergen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2511 days.

(21) Appl. No.: 11/588,225

(22) Filed: Oct. 27, 2006

(65) Prior Publication Data

US 2007/0067635 A1   Mar. 22, 2007

Related U.S. Application Data

(63) Continuation of application No. PCT/EP2004/004665, filed on Apr. 29, 2004.

(51) Int. Cl.
| | |
|---|---|
| H04L 9/00 | (2006.01) |
| H04L 9/32 | (2006.01) |
| B60R 25/04 | (2013.01) |
| B60R 25/00 | (2013.01) |

(52) U.S. Cl.
CPC ............... *B60R 25/04* (2013.01); *H04L 9/3247* (2013.01); *H04L 2209/84* (2013.01); *H04L 9/3236* (2013.01); *B60R 25/00* (2013.01)
USPC ................ 713/176; 713/150; 713/168; 726/2

(58) Field of Classification Search
USPC .................. 713/1, 2, 188, 194, 150, 168, 176; 380/200, 201, 255, 277; 726/2
See application file for complete search history.

(56) References Cited

U.S. PATENT DOCUMENTS

| | | | |
|---|---|---|---|
| 5,708,712 A | | 1/1998 | Brinkmeyer et al. |
| 5,774,550 A | * | 6/1998 | Brinkmeyer et al. ......... 713/168 |

(Continued)

FOREIGN PATENT DOCUMENTS

| | | |
|---|---|---|
| DE | 101 41 737 C1 | 4/2003 |
| DE | 101 48 323 A1 | 4/2003 |

(Continued)

OTHER PUBLICATIONS

Menezes et al., "Handbook of Applied Cryptography" Handbook of Applied Cryptography, CRC Press Series on Discrete Mathematics and its Applications, Boca Baton, FL, CRC Press, 1997, pp. 400-405, XP002143934.

(Continued)

*Primary Examiner* — Saleh Najjar
*Assistant Examiner* — Peiliang Pan
(74) *Attorney, Agent, or Firm* — Crowell & Moring LLP

(57) ABSTRACT

A method for authenticating a vehicle-external device in a bus system of a motor vehicle comprising control units is provided. In order to effectively and inexpensively prevent a sequence control system that is stored in a control unit from being manipulated, an authentication device is provided in the bus system. The authentication device transmits an authentication request to the vehicle-external device. The vehicle-external device signs the authentication request with a secret key of an asymmetric pair of keys, such as a pair of public keys, and transmits the signed authentication request or exclusively the signature to the authentication device. The authentication device determines a signature of the authentication request using the same algorithm as the vehicle-external device, and decodes the signature transmitted by the vehicle-external device using the public key which is complementary to the secret key, and compares the determined signature with the transmitted signature.

6 Claims, 3 Drawing Sheets

(56) References Cited

U.S. PATENT DOCUMENTS

Figure 1:
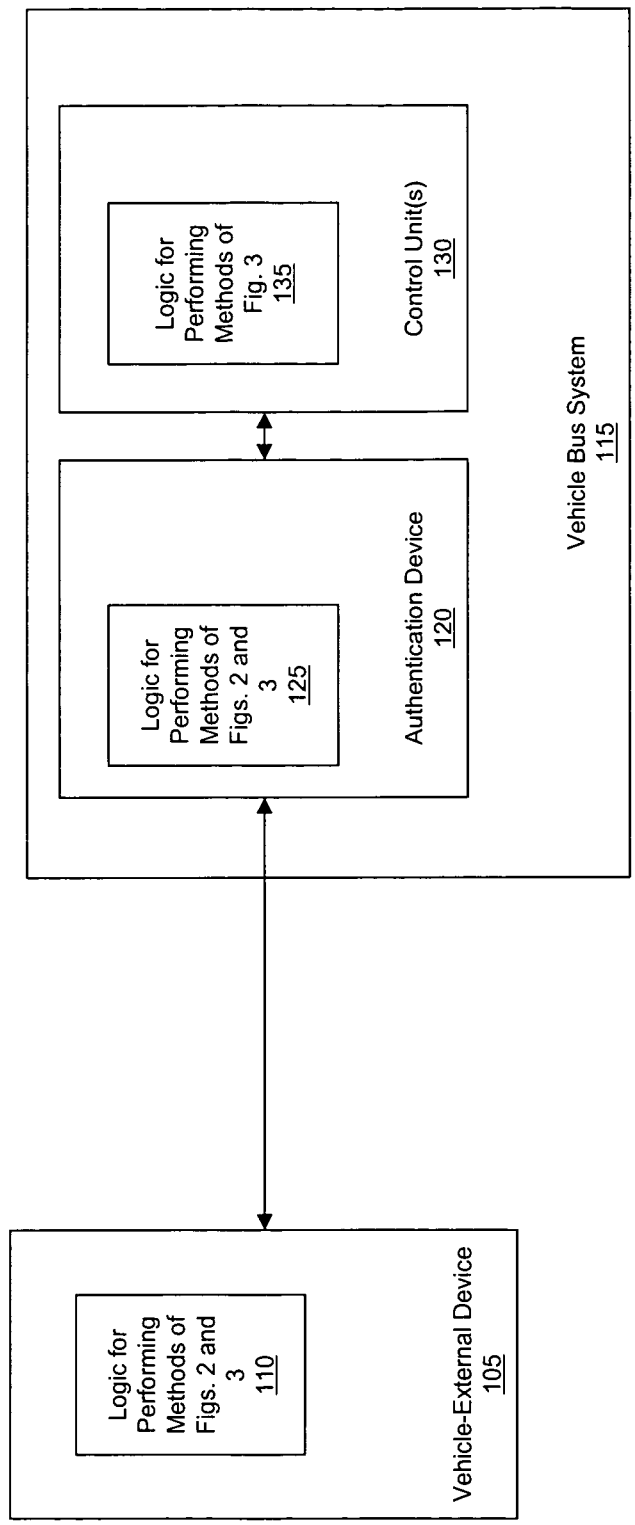

| | | | |
|---|---|---|---|
| 6,032,257 | A | 2/2000 | Olarig et al. |
| 6,151,676 | A * | 11/2000 | Cuccia et al. ............... 713/176 |
| 6,377,688 | B1 * | 4/2002 | Numao ........................ 380/30 |
| 6,526,460 | B1 | 2/2003 | Dauner et al. |
| 6,587,030 | B2 | 7/2003 | Bitzer |
| 7,010,682 | B2 * | 3/2006 | Reinold et al. ............... 713/155 |
| 7,197,642 | B2 * | 3/2007 | Walmsley et al. ............ 713/168 |
| 2002/0152398 | A1 | 10/2002 | Krumrein |
| 2002/0194476 | A1 | 12/2002 | Lewis et al. |
| 2003/0093663 | A1 * | 5/2003 | Walker ........................ 713/150 |
| 2004/0039906 | A1 * | 2/2004 | Oka et al. ..................... 713/156 |
| 2006/0100749 | A1 | 5/2006 | Feilen et al. |

FOREIGN PATENT DOCUMENTS

| | | |
|---|---|---|
| DE | 102 38 093 A1 | 3/2004 |
| EP | 1 225 510 A2 | 7/2002 |
| WO | WO 97/39553 A1 | 10/1997 |

OTHER PUBLICATIONS

International Search Report dated Oct. 13, 2004 with English translation thereof (six (6) pages).
International Search Report dated Dec. 21, 2004 with English translation thereof (four (4) pages).
Forms PCT/IB/338 & PCT/IB/373 and English translation of Form PCT/ISA/237 (Eight (8) pages).

* cited by examiner

AUTHENTICATION OF A VEHICLE-EXTERNAL DEVICE

CROSS REFERENCE TO RELATED APPLICATIONS

This application is a continuation of PCT International Application No. PCT/EP2004/004665, filed Apr. 29, 2004, the entire disclosure of which is herein expressly incorporated by reference. This application is related to PCT International Application No. PCT/EP2004/004666, filed Apr. 29, 2004, and U.S. patent application Ser. No. 11/588,235, entitled "Authentication of Control Units in a Vehicle," which is filed on even date herewith. The entire contents of the related applications are herein expressly incorporated by reference.

BACKGROUND AND SUMMARY OF THE INVENTION

The invention relates to a method for authenticating a vehicle-external device in a bus system of a motor vehicle comprising control units.

In order to prevent the sequence control system, which is stored in control units, or the corresponding software, which is executed by one or more of the processors, provided in the control units, from being manipulated, it is important to monitor the authorization of the access to the control units. The authorization may be verified by cryptographic measures.

Execution of the corresponding cryptographic measures stresses the processor(s) of the control unit and other hardware components of the control unit or requires more powerful and, thus, more expensive control units. The more powerful control units may be required in a control unit that is used millions of times, as in the case of the control unit of a motor vehicle.

Exemplary embodiments of the present invention provide a method that effectively and inexpensively prevents a sequence control system, which is stored in a control unit, from being manipulated.

Other objects, advantages and novel features of the present invention will become apparent from the following detailed description of the invention when considered in conjunction with the accompanying drawings.

BRIEF DESCRIPTION OF THE DRAWING FIGURES

Figure 2:
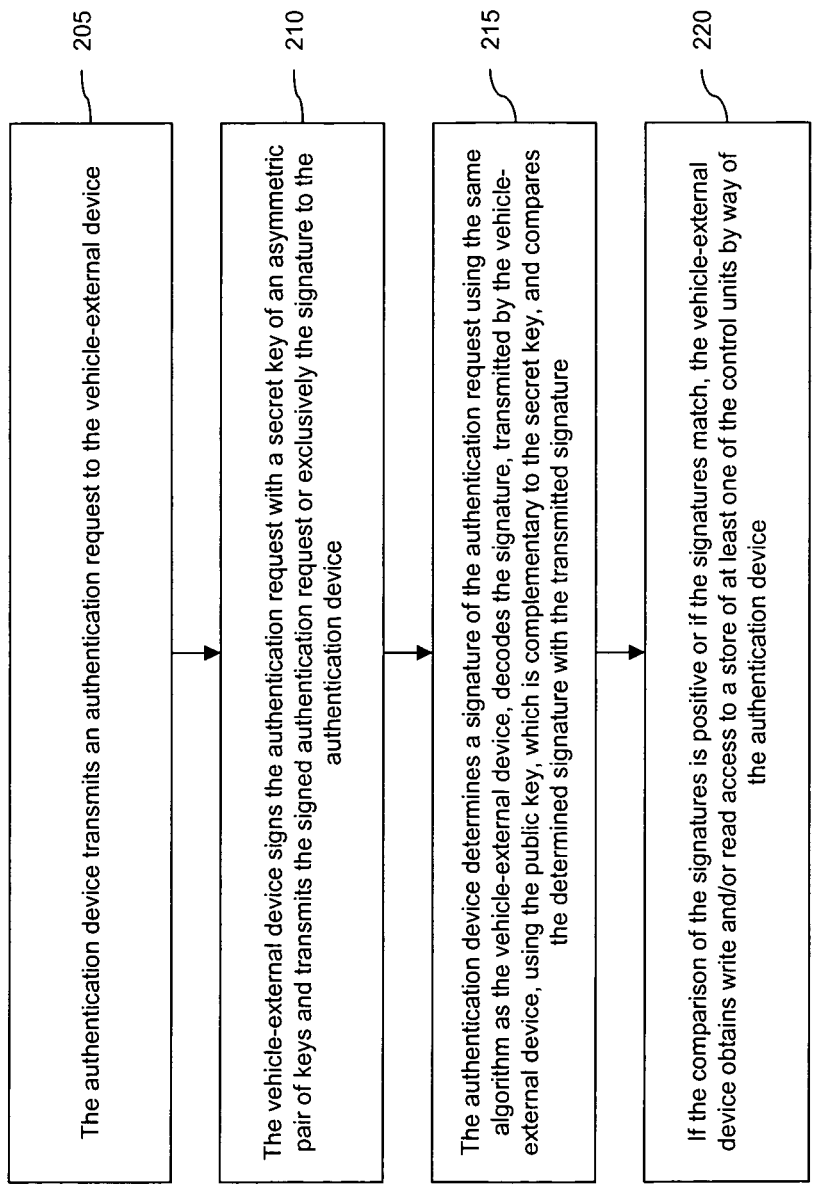
Figure 3:
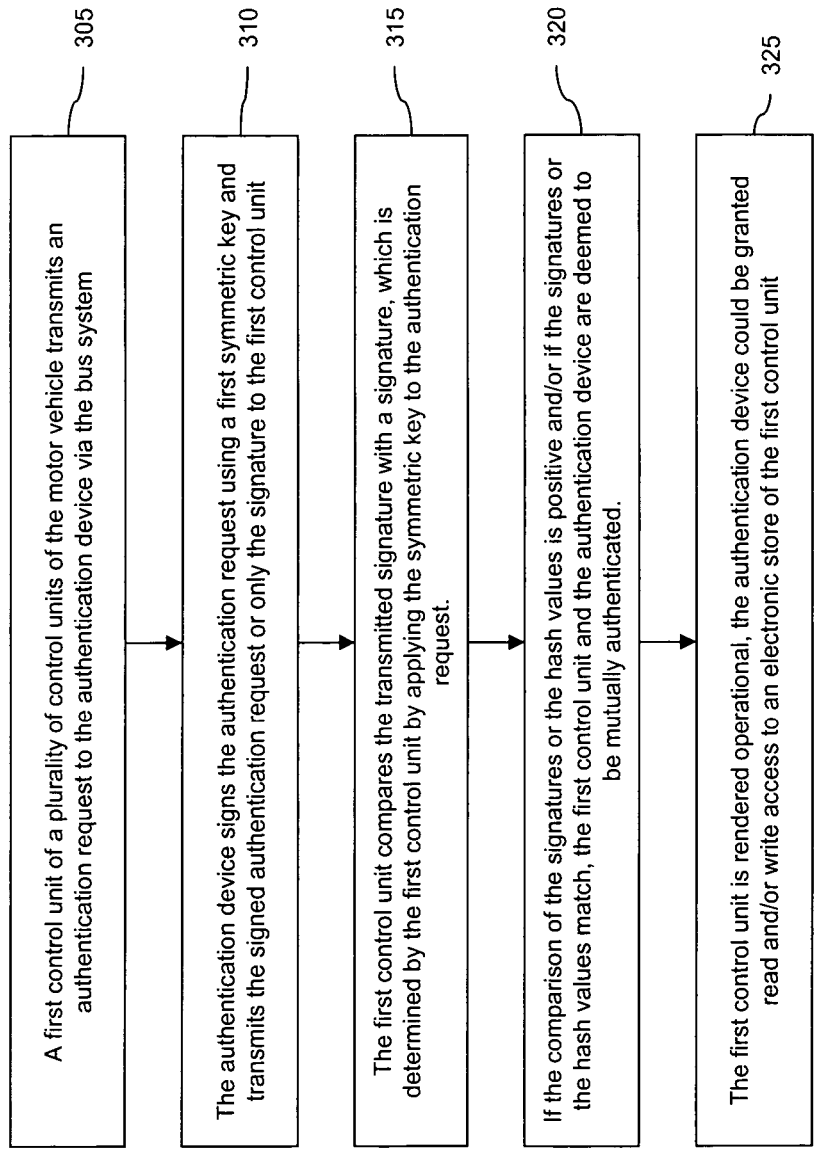

FIG. 1 illustrates an exemplary system in accordance with the present invention;
FIG. 2 illustrates an exemplary method in accordance with one embodiment of the present invention; and
FIG. 3 illustrates an exemplary method in accordance with another embodiment of the present invention.

DETAILED DESCRIPTION OF THE DRAWINGS

FIG. 1 illustrates an exemplary system in accordance with the present invention. The system includes vehicle-external device 105 and a vehicle bus system 115. Vehicle bus system 115 includes authentication device 120 and control unit(s) 130. Vehicle-external device 105 includes logic for performing the relevant portions of the methods of FIGS. 2 and 3 described below, authentication device 120 includes logic for performing the relevant portions of the methods of FIGS. 2 and 3 described below, and control unit(s) 130 includes logic for performing the relevant portions of the method of FIG. 3 described below. This logic can be a processor that a computer program product loaded from a computer readable medium, an application specific integrated circuit (ASIC), field programmable gate array (FPGA), and/or the like.

Referring to FIG. 2, in accordance with exemplary embodiments of the present invention, an authentication device, provided in the bus system, transmits an authentication request to the vehicle-external device (step 205). The vehicle-external device signs the authentication request with a secret key of an asymmetric pair of keys, in particular a pair of public keys, and transmits the signed authentication request or exclusively the signature to the authentication device (step 210). The authentication request can be a random number or the like, which is generated by the authentication device unit and which is generated only once. The authentication device can be a central control unit, which has access to the public key of the pair of public keys and carries out a public key method.

The authentication device determines a signature of the authentication request using the same algorithm as the vehicle-external device, decodes the signature, transmitted by the vehicle-external device, using the public key, which is complementary to the secret key, and compares the determined signature with the transmitted signature (step 215).

If the comparison of the signatures is positive or if the signatures match, the vehicle-external device obtains write and/or read access to a store of at least one of the control units by way of the authentication device (step 220).

In accordance with one embodiment of the present invention, the vehicle-external device can provide the store of one or more of the control units with a new sequence control system or software and/or with an activation code. The new sequence control system may be a sequence control system that has been updated with respect to the previous sequence control system, that eliminates software problems, and/or renders operational additional functions of the control unit. The new sequence control system may be an addition to the sequence control system, which is already stored in the control unit and which renders operational in particular additional functions of the control unit.

The activation code may be data, said code activating—especially limited by time—a sequence control system or the software that is kept operational to run in the control unit or at another location in the vehicle. In other words, the sequence control system or the software that is already stored in the vehicle may not be carried out until after the activation code has been made operational in the vehicle.

In an alternative or additional embodiment of the present invention the following measures are provided for authenticating control units or for testing whether there are authorized control units in the bus system. Referring now to FIG. 3, a first control unit of a plurality of control units of the motor vehicle transmits an authentication request to the authentication device via the bus system (step 305).

The authentication request can be a random number or the like, which is generated by the control unit and which is generated only once. The authentication device is designed in such a manner that it has access to a symmetric, cryptographic key and may carry out a symmetric cryptographic method.

The execution of a symmetric cryptographic method avails itself to the resources, in particular the processor, the control unit and/or the authentication device considerably less than an asymmetric method, so that in applying the present invention, the authentication of the control units in a vehicle with respect to the authentication device may be realized at a significantly more reasonable cost.

The authentication device signs the authentication request using a first symmetric key and transmits the signed authentication request or only the signature to the first control unit (step 310). The signing or the creation of the signature occurs by applying a hash algorithm to the authentication request or rather the authentication data. The hash algorithm gives a hash value, which is characteristic of the specific authentication data. The hash value is encoded with the first symmetric key; and the encoded hash value is attached to the authentication request or rather to the authentication data and transmitted together with the authentication request to the first control unit. As an alternative, only the signature and/or the encoded hash value may be transmitted to the first control unit, because the authentication request was created, of course, in said first control unit and, therefore, already exists.

The first control unit compares the transmitted signature with a signature, which is determined by the first control unit by applying the symmetric key to the authentication request (step 315). The signature may be determined by the first control unit in that the same hash algorithm, which was applied by the authentication device to the authentication request for determining the signature, is also applied by the first control unit to the authentication request. The result in turn is a hash value. This hash value or the signature, which is created on the basis of the hash value using the symmetric key, is compared in turn with the transmitted signature or the hash value, which is obtained from the transmitted signature, in turn by using the symmetric key.

If the comparison of the signatures or the hash values is positive and/or if the signatures or the hash values match, the first control unit and the authentication device are deemed to be mutually authenticated (step 320). That is, for the control unit the authentication device is deemed to be genuine or authorized and vice versa. Accordingly, in the event of a positive comparison and/or a match, the first control unit is preferably rendered operational (step 325). As an alternative or in addition, the authentication device could be granted read and/or write access to an electronic store of the first control unit.

In accordance with one embodiment of the present invention, one or more of the other control units of the bus system carries out or carry out in the described manner an authentication with the authentication device. Using these measures, one may also check whether there are unauthorized control units or an unauthorized authentication device in the bus system. In accordance with another embodiment of the present invention the authentication of the control units with respect to the authentication device is carried out one after the other. This reduces the necessary hardware resources.

In accordance with one embodiment of the invention, the motor vehicle may be started up only after all of the control units of the bus system have executed to a significant extent the method for authenticating with positive results from the comparison. In this way the working reliability of the bus system and/or the compatibility of the bus participants may be guaranteed. Similarly this measure increases the anti-theft protection of the motor vehicle that is equipped with the bus system of the invention, when an engine immobilizer system is integrated into the bus system and/or into the control units.

In accordance with a further embodiment of the present invention the execution of the authentication method is carried out prior to starting the vehicle, preferably after opening the vehicle. With this measure the working reliability, compatibility, etc. are checked not just once, but periodically.

In yet another embodiment of the present invention, prior to starting the vehicle the inventive authentication method is carried out only for those control units that have to be available when starting the vehicle, in order to render the vehicle operational—if desired—with a short lead time. After the start procedure of the vehicle, the inventive authentication method may be carried out for the other control units, without impeding the startup process of the motor vehicle.

Another embodiment of the present invention provides that all control units use the same symmetric key in carrying out the authentication method. This measure makes the key management simple and has additionally the advantage that the control units of the vehicle concerned are assigned in this way to each other.

The symmetric key can vary from vehicle to vehicle, and in carrying out the inventive authentication method, a control unit of a first vehicle accesses a first symmetric key; and in carrying out the method, the same control unit of a second vehicle accesses a second symmetric key or rather uses such a second symmetric key.

The symmetric key can be "housed" in the bus system in such a manner that it may be read (that is, remains secret and may not be altered in an unauthorized manner) only by the authentication device and by the control units, involved in the method. In accordance with one aspect of the invention, the symmetric key is stored in the non-externally readable or alterable boot area of each control unit and in the corresponding area of the authentication device.

Since the symmetric key varies from vehicle to vehicle, spying out the symmetric key of a specific vehicle is comparatively harmless. Of course, the situation would be totally different, if a symmetric key of a vehicle that "fits" all vehicles of the same model were spied out.

One embodiment of the invention provides that the inventive method runs in the reverse direction. That is, the authentication device transmits an authentication request to the first control unit; the first control unit signs the authentication request with the first symmetric key and transmits the signed authentication request to the authentication device. In so doing, the comparison is shifted from the control unit to the authentication device. This is done by relieving each control unit of its resources and loading the authentication device with the resources. The repeated shedding of resources, as compared to a single loading of resources, results in a reduction in the cost of hardware.

The invention makes possible a bus system of a motor vehicle with control units. The bus system has an authentication device; and a method, according to the invention, is carried out in the bus system. Furthermore, the invention makes possible a computer program product for authenticating a vehicle-external device in a bus system of a motor vehicle comprising control units; said computer program product allows a method, according to one or more of the following method claims, to run.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for authenticating a vehicle-external device in a bus system of a motor vehicle comprising control units, the bus system including an authentication device, the method comprising the acts of:

transmitting, by the authentication device, an authentication request to the vehicle-external device;

signing, by the vehicle-external device, the authentication request with a signature using a secret key of an asymmetric pair of keys;

transmitting, by the vehicle-external device, only the signature to the authentication device;

determining, by the authentication device, a signature of the authentication request using a same algorithm as the vehicle-external device;

decoding the signature transmitted by the vehicle-external device using the public key, which is complementary to the secret key; and comparing the determined signature with the transmitted signature;

wherein, when comparing the determined signature and the transmitted signature results in a positive comparison or match, the vehicle-external device obtains write and/or read access to a store of at least one of the control units by way of the authentication device, further wherein:

a first control unit transmits an authentication request to the authentication device for authenticating the control units, the authentication device signs the authentication request using a first symmetric key and transmits only the signature to the first control unit, wherein the first control unit compares the transmitted signature of the authentication request with a signature, which is determined by the first control unit by applying the symmetric key to the authentication request; or the first control unit decodes the transmitted signature of the authentication request using the first symmetric key, and a first hash value is obtained, and the first control unit applies a hash algorithm to the authentication request, whereby a second hash value is obtained; and the first control unit is rendered operational if the comparison of the signatures and/or the hash values is positive and/or if the signatures and/or the hash values match, and the motor vehicle may be started up only after all of the control units of the bus system have executed the method for authentication with positive results from the comparison.

2. The method of claim 1, wherein one or more of the other control units of the bus system carries out the method for authentication.

3. The method of claim 1 wherein the execution of the authentication method is carried out prior to starting the vehicle.

4. The method of claim 1, wherein all control units use the same symmetric key in carrying out the authentication method.

5. The method of claim 1, wherein the symmetric key varies from vehicle to vehicle, and in carrying out the method a control unit of a first vehicle uses a first symmetric key and the same control unit of a second vehicle uses a second symmetric key.

6. The method of claim 1, wherein the asymmetric pair of keys are a pair of public keys.

\* \* \* \* \*